US012624718B2

(12) United States Patent

Squire

(10) Patent No.: US 12,624,718 B2
(45) Date of Patent: May 12, 2026

(54) TURNBUCKLE DEVICE

(71) Applicant: Latchways Plc, Devizes (GB)

(72) Inventor: Jacob Squire, Devizes (GB)

(73) Assignee: MSA Technology, LLC, Cranberry Township, PA (US)

( * ) Notice: Subject to any disclaimer, the term of this patent is extended or adjusted under 35 U.S.C. 154(b) by 362 days.

(21) Appl. No.: 17/633,001

(22) PCT Filed: Aug. 5, 2020

(86) PCT No.: PCT/EP2020/072018
§ 371 (c)(1),
(2) Date: Feb. 4, 2022

(87) PCT Pub. No.: WO2021/023777
PCT Pub. Date: Feb. 11, 2021

(65) Prior Publication Data
US 2022/0290737 A1 Sep. 15, 2022

(30) Foreign Application Priority Data
Aug. 7, 2019 (GB) ...................................... 1911308

(51) Int. Cl.
*F16B 7/06* (2006.01)
*A62B 35/00* (2006.01)
(Continued)

(52) U.S. Cl.
CPC ............ *F16B 7/06* (2013.01); *A62B 35/0043* (2013.01); *E04G 21/3276* (2013.01); *F16G 11/12* (2013.01); *Y10T 403/291* (2015.01)

(58) Field of Classification Search
CPC ........ F16B 7/06; F16G 11/12; A62B 35/0043; E04G 21/3276; Y10T 403/29; Y10T 403/291; Y10T 403/295
See application file for complete search history.

(56) References Cited

U.S. PATENT DOCUMENTS 310,767 A       1/1885  Wilson
1,393,614 A *  10/1921  Ferragamo .............. F16G 11/12
403/44

(Continued)

FOREIGN PATENT DOCUMENTS

CN          1215482       4/1999
CN          101278442      10/2008
(Continued)

OTHER PUBLICATIONS

UK IP Office, Appl. GB1911308.3, Examination Report, Jan. 23, 2023.

(Continued)

*Primary Examiner* — Matthew R Mcmahon
(74) *Attorney, Agent, or Firm* — Jones Day

(57) ABSTRACT

A turnbuckle device for tensioning a safety line includes a body having a pair of opposing ends, with each end having a threaded bore. The turnbuckle device further includes a pair of connectors, with each connector having a threaded shaft configured for being received in the threaded bore of one of the pair of opposing ends of the body. The turnbuckle device further includes a handle connected to the body. The handle is movable between a stowed position and an operational position. In the operational position, the handle is configured for facilitating rotation of the body about a longitudinal axis of the body.

6 Claims, 4 Drawing Sheets

(51) Int. Cl.
　E04G 21/32　　(2006.01)
　F16G 11/12　　(2006.01)

(56)　　　　References Cited

U.S. PATENT DOCUMENTS

| | | | | |
|---|---|---|---|---|
| 1,467,319 A * | 9/1923 | Hoffmann | F16G 11/12 | |
| | | | | 403/44 |
| 2,550,018 A * | 4/1951 | Weiland | F16G 11/12 | |
| | | | | 24/71 CT |
| 2,790,658 A | 4/1957 | Robinson | | |
| 2,845,288 A | 7/1958 | Cierpik | | |
| 2,878,043 A * | 3/1959 | Edman | A01B 59/004 | |
| | | | | 403/46 |
| 2,920,912 A * | 1/1960 | Hess | A01B 59/004 | |
| | | | | 403/46 |
| 3,851,978 A * | 12/1974 | Kuipers | F16B 7/06 | |
| | | | | 403/45 |
| 4,198,174 A | 4/1980 | Borowiec et al. | | |
| 4,594,018 A | 6/1986 | Larsson et al. | | |
| 4,778,194 A * | 10/1988 | Koch | F16C 7/06 | |
| | | | | 403/46 |
| 5,076,369 A * | 12/1991 | Herchenbach | B60D 1/249 | |
| | | | | 172/679 |
| 5,156,482 A * | 10/1992 | Owings | F16G 11/12 | |
| | | | | 403/46 |
| 5,165,137 A * | 11/1992 | Amrein | A61G 13/121 | |
| | | | | 403/44 |
| 5,458,214 A | 10/1995 | Olson et al. | | |
| 5,906,450 A * | 5/1999 | Ng | F16G 11/12 | |
| | | | | 403/22 |
| 6,161,981 A * | 12/2000 | Dehlin | F16G 11/12 | |
| | | | | 403/45 |
| 6,609,575 B1 * | 8/2003 | Crabb | B60D 1/141 | |
| | | | | 280/491.2 |
| 6,655,468 B2 * | 12/2003 | Casali | A01B 59/004 | |
| | | | | 403/44 |
| 7,048,071 B1 * | 5/2006 | Huenink | A01B 59/004 | |
| | | | | 403/46 |
| 7,237,977 B2 * | 7/2007 | Kay | F16G 11/12 | |
| | | | | 403/45 |
| 9,970,466 B1 * | 5/2018 | Randolph | F16B 7/06 | |
| 10,385,913 B2 * | 8/2019 | Stahl | F16C 7/06 | |
| 10,464,467 B2 * | 11/2019 | Robins | B60P 7/0853 | |
| 11,333,220 B2 * | 5/2022 | Redder | F16G 11/12 | |
| 12,398,782 B2 * | 8/2025 | Schoebel | F16G 11/12 | |
| 2021/0301902 A1 | 9/2021 | Redder | | |
| 2025/0035189 A1 * | 1/2025 | Eulette | F16G 11/12 | |

FOREIGN PATENT DOCUMENTS

| | | | | |
|---|---|---|---|---|
| CN | 205290775 | 6/2016 | | |
| DE | 2310152 A | 9/1974 | | |
| DE | 3230132 A1 * | 2/1984 | | F16B 7/06 |
| DE | 9406019 U1 | 6/1994 | | |
| EP | 1671527 B1 | 11/2009 | | |
| FR | 2814789 A1 | 4/2002 | | |
| GB | 1383737 A | 2/1974 | | |
| GB | 1383737 | 2/1975 | | |
| GB | 1426152 | 2/1976 | | |
| JP | 5352857 A | 5/1978 | | |
| JP | S5352857 A * | 5/1978 | | |
| KR | 200357407 Y1 | 7/2004 | | |
| KR | 2005-0055333 | 6/2005 | | |
| KR | 20050055333 A * | 6/2005 | | |
| SU | 448323 | 10/1974 | | |
| SU | 448323 A1 * | 10/1974 | | |
| SU | 1117414 A | 10/1984 | | |
| SU | 1117414 A1 | 10/1984 | | |
| WO | 9808003 A1 | 2/1998 | | |
| WO | 2018073098 A1 | 4/2018 | | |

OTHER PUBLICATIONS

Chilean Patent Office, Appl. 2022-203, Second Office Action, Oct. 10, 2023.

China Patent Office, Appl. 202080055423.7, Office Action, Mar. 18, 2024.

European Patent Office, Appl. 20763985.7, Communication pursuant to Article 94(3), Dec. 12, 2023.

European Patent Office, Appl. 20763985.7, Communication pursuant to Article 94(3), Feb. 20, 2024.

EP Patent Office, Appl. 20763985.7, Communication pursuant to Article 94(3), Feb. 14, 2023.

EP Patent Office, Appl. 20763985.7, Communication pursuant to Article 94(3), Jul. 21, 2023.

China Patent Office, Appl. 202080055423.7, Office Action, Jun. 13, 2024.

Brazilian Patent Office, Appl. BR112022002046-5, Preliminary Requirement, Feb. 25, 2025.

* cited by examiner

TURNBUCKLE DEVICE

CROSS-REFERENCE TO RELATED APPLICATIONS

This application is the United States national phase of International Application No. PCT/EP2020/072018 filed Aug. 5, 2020, and claims priority to United Kingdom Patent Application No. 1911308.3, filed Aug. 7, 2019, the disclosures of which are hereby incorporated by reference in their entirety.

BACKGROUND

Technical Field

The present disclosure relates to a turnbuckle device, and in particular a turnbuckle device as used for tensioning height safety apparatus, such as lifelines or safety lines extending between anchor points.

Technical Considerations

In height safety applications, turnbuckle devices are used to tension lifelines, such as safety lines extending between anchor points. The turnbuckle device has a first screw threaded element connected to an end of the lifeline and a second screw threaded element connected to the anchor point. The screw threaded elements are received in respective threaded bores at opposed ends of the turnbuckle body or chassis. As the turnbuckle body or chassis is rotated about its axis in a first direction, the threaded elements are drawn into the turnbuckle body or chassis, thereby tensioning the safety line. Rotation of the turnbuckle in the opposite direction results in the threaded elements moving apart from one another and slackening the safety line.

Referring to FIG. 1 and FIG. 2, there is shown a safety line arrangement in which a prior art turnbuckle 1 is used to tension a safety line 2 between two anchor points 3, 4. In the safety line arrangement shown, a plastically deformable energy absorber 5 is positioned intermediately between the turnbuckle 1 and the adjacent anchor point 3. The energy absorber 5 is secured to a first one of the screw threaded turnbuckle connectors. The other of the screw threaded turnbuckle connectors is secured to the lifeline 2.

As described above, as the turnbuckle body or chassis is rotated about its axis in a first direction, the threaded turnbuckle connectors are drawn into the turnbuckle body or chassis, thereby tensioning the safety line 2. Rotation of the turnbuckle 1 in the opposite direction results in the threaded elements moving apart from one another and slackening the safety line 2.

SUMMARY

Therefore, in some non-limiting embodiments or aspects, an improved turnbuckle device has now been devised.

In some non-limiting embodiments or aspects, a turnbuckle device for tensioning a safety line may include a body having a pair of opposing ends, with each end having a threaded bore; a pair of connectors, with each connector having a threaded shaft configured for being received in the threaded bore of one of the pair of opposing ends of the body; and a handle connected to the body. The handle may be movable between a stowed position and an operational position. In the operational position, the handle may be configured for facilitating rotation of the body about a longitudinal axis of the body.

In some non-limiting embodiments or aspects, the handle may be movable through 90 degrees between the stowed position and the operational position.

In some non-limiting embodiments or aspects, the handle may be pivotally connected to the body by a pivot connection mounted in a support boss of the body.

In some non-limiting embodiments or aspects, in the stowed position, a longitudinal axis of the handle may be substantially parallel to the longitudinal axis of the body.

In some non-limiting embodiments or aspects, in the stowed position, the handle may be nested in a receiving recess in the body.

In some non-limiting embodiments or aspects, in the operational position, a longitudinal axis of the handle may be substantially transverse to the longitudinal axis of the body.

In some non-limiting embodiments or aspects, rotation of the handle in the operational position in a first direction may rotate the body about the longitudinal axis to extend the pair of connectors out of the body.

In some non-limiting embodiments or aspects, rotation of the handle in the operational position in a second direction may rotate the body about the longitudinal axis to retract the pair of connectors into the body.

In some non-limiting embodiments or aspects, a diameter of a first of the pair of connectors may be smaller than a diameter of a second of the pair of connectors.

In some non-limiting embodiments or aspects, the threaded shaft of the first of the pair of connectors may have an elongate axial bore configured for receiving the threaded shaft of the second of the pair of connectors within the elongate axial bore.

In some non-limiting embodiments or aspects, the threaded shaft of the second of the pair of connectors may be fully received within the elongate axial bore of the threaded shaft of the first of the pair of connectors in a maximum tension position of the connectors.

In some non-limiting embodiments or aspects, the handle may be secured in the receiving recess in a semi interference or resiliently gripping fit.

In some non-limiting embodiments or aspects, a securing arrangement may be provided for securing the handle in the stowed position.

In some non-limiting embodiments or aspects, a terminus of each of the pair of connectors may be an eye.

In some non-limiting embodiments or aspects, the handle may be integrally connected to the body.

In some non-limiting embodiments or aspects, there is provided a turnbuckle device incorporating a turning handle mounted on-board the device.

In some non-limiting embodiments or aspects, the on-board turning handle may be mounted to a chassis or body of the turnbuckle device.

In some non-limiting embodiments or aspects, the on-board turning handle may be movable between a stowed position and a deployed position.

In some non-limiting embodiments or aspects, in the stowed position, the handle may be oriented in a direction substantially parallel to the longitudinal axis of the turnbuckle chassis or body.

In some non-limiting embodiments or aspects, in the deployed position, the handle may be orientated substantially transversely to the longitudinal axis of the turnbuckle chassis or body.

In some non-limiting embodiments or aspects, the handle may be preferably movable between the stowed and deployed positions whilst remaining at all times connected to the device. To this end, the handle may be pivotably connected and pivotally movable between the stowed and deployed positions.

In some non-limiting embodiments or aspects, the handle may be pivotally mounted proximate to its proximal end in the region of one longitudinal end of the turnbuckle chassis or body, and the handle extends from the pivotal mounting along the majority of the length of the chassis or body, when positioned in the stowed orientation.

In some non-limiting embodiments or aspects, in the stowed position, the proximal portion of the handle may be mounted to the chassis or body of the turnbuckle device, and a portion of the handle spaced from the proximal portion may be nested or received in a recess of the chassis or body of the turnbuckle device.

In some non-limiting embodiments or aspects, the turnbuckle device may have first and second threaded tensioning elements, each received in a respective threaded bore of the turnbuckle chassis or body. In tensioning the turnbuckle device, one of the first and second threaded tensioning elements becomes received in a longitudinal bore provided in the other of the first and second threaded tensioning elements.

There is synergy in providing the turnbuckle with an integrated operating handle and tensioning elements that are configured for one of the threaded elements to be received in the other. This is because the overall length of the turnbuckle body or chassis can be made shorter but allow a handle of sufficient length to be accommodated between the opposed ends of the turnbuckle body or chassis. This allows for overall weight optimisation.

In some non-limiting embodiments or aspects, tensioning elements that are configured for one of the threaded elements to be received in the other also means that only one of the threaded shafts is exposed to potential damage in transit, and having one with a hollow bore also reduces the weight of the turnbuckle significantly.

Further non-limiting embodiments or aspects are set forth in the following numbered clauses:

Clause 1. A turnbuckle device for tensioning a safety line, the turnbuckle device comprising: a body having a pair of opposing ends, with each end having a threaded bore; a pair of connectors, with each connector having a threaded shaft configured for being received in the threaded bore of one of the pair of opposing ends of the body; and a handle connected to the body, wherein the handle is movable between a stowed position and an operational position, and wherein, in the operational position, the handle is configured for facilitating rotation of the body about a longitudinal axis of the body.

Clause 2. The turnbuckle device according to clause 1, wherein the handle is movable through 90 degrees between the stowed position and the operational position.

Clause 3. The turnbuckle device according to clause 1 or 2, wherein the handle is pivotally connected to the body by a pivot connection mounted in a support boss of the body.

Clause 4. The turnbuckle device according to any of clauses 1-3, wherein, in the stowed position, a longitudinal axis of the handle is substantially parallel to the longitudinal axis of the body.

Clause 5. The turnbuckle device according to any of clauses 1-4, wherein, in the stowed position, the handle is nested in a receiving recess in the body.

Clause 6. The turnbuckle device according to any of clauses 1-5, wherein, in the operational position, a longitudinal axis of the handle is substantially transverse to the longitudinal axis of the body.

Clause 7. The turnbuckle device according to any of clauses 1-6, wherein rotation of the handle in the operational position in a first direction rotates the body about the longitudinal axis to extend the pair of connectors out of the body.

Clause 8. The turnbuckle device according to any of clauses 1-7, wherein rotation of the handle in the operational position in a second direction rotates the body about the longitudinal axis to retract the pair of connectors into the body.

Clause 9. The turnbuckle device according to any of clauses 1-8, wherein a diameter of a first of the pair of connectors is smaller than a diameter of a second of the pair of connectors.

Clause 10. The turnbuckle device according to any of clauses 1-9, wherein the threaded shaft of the first of the pair of connectors has an elongate axial bore configured for receiving the threaded shaft of the second of the pair of connectors within the elongate axial bore.

Clause 11. The turnbuckle device according to any of clauses 1-10, wherein the threaded shaft of the second of the pair of connectors is fully received within the elongate axial bore of the threaded shaft of the first of the pair of connectors in a maximum tension position of the connectors.

Clause 12. The turnbuckle device according to any of clauses 1-11, wherein the handle is secured in the receiving recess in a semi interference or resiliently gripping fit.

Clause 13. The turnbuckle device according to any of clauses 1-12, further comprising a securing arrangement for securing the handle in the stowed position.

Clause 14. The turnbuckle device according to any of clauses 1-13, wherein a terminus of each of the pair of connectors is an eye.

Clause 15. The turnbuckle according to any of clauses 1-14, wherein the handle is integrally connected to the body.

Clause 16. A turnbuckle device incorporating a turning element or handle mounted on-board the turnbuckle device.

Clause 17. The turnbuckle device according to clause 16, wherein the on-board turning element or handle is mounted to a chassis or body of the turnbuckle device.

Clause 18. The device according to clause 16 or 17, wherein the on-board turning element or handle is movable between a stowed position and a deployed position.

Clause 19. The device according to any of clauses 16-18, wherein in the stowed position the turning element or handle is oriented in a direction substantially parallel to the longitudinal axis of the turnbuckle chassis or body.

Clause 20. The device according to any of clauses 16-19, wherein in the deployed position the turning element or handle is orientated substantially transversely to the longitudinal axis of the turnbuckle chassis or body.

Clause 21. The device according to any of any of clauses 16-20, wherein the turning element or handle is pivotably movable between the stowed and deployed positions.

Clause 22. The device according to any of clauses 16-21, wherein the turning element or handle is pivotally mounted proximate its proximal end in the region of one longitudinal end of the turnbuckle chassis or body, and the turning element or handle extends from the pivotal mounting along the majority of the length of the chassis or body, when positioned in the stowed orientation.

Clause 23. The device according to any of clauses 16-22, wherein in the stowed position the proximal portion of the turning element or handle is connection mounted to the chassis or body of the turnbuckle device, and a portion of the handle spaced from the proximal portion is nested or received in a recess of the chassis or body of the turnbuckle device.

Clause 24. The device according to any of clauses 16-23, wherein the device comprises first and second threaded tensioning elements, each received in a respective threaded bore of the turnbuckle chassis or body and wherein in tensioning the device, one of the first and second threaded tensioning elements, becomes received in a longitudinal bore provided in the other of first and second threaded tensioning elements.

Clause 25. The height safety system including a device according to any of clauses 16-24 tensioning a safety line.

These and other features and characteristics of the turnbuckle device described herein, as well as the methods of manufacture of such turnbuckle device, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only.

BRIEF DESCRIPTION OF THE DRAWINGS

By means of exemplary and non-limiting embodiments or aspects, the turnbuckle device will be described with reference to the accompanying Figures, in which.

DETAILED DESCRIPTION

Figure 1:
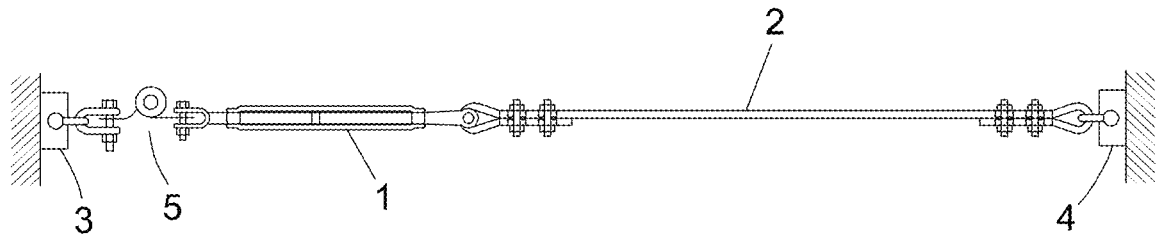
FIG. 1 is schematic view of a safety line system incorporating a conventional turnbuckle device according to the prior art.

As used herein, the singular form of "a", "an", and "the" include plural referents unless the context clearly dictates otherwise.

Spatial or directional terms, such as "left", "right", "inner", "outer", "above", "below", and the like, relate to the embodiments or aspects as shown in the drawing figures and are not to be considered as limiting as the embodiments or aspects can assume various alternative orientations.

All numbers used in the specification and claims are to be understood as being modified in all instances by the term "about". By "about" is meant within plus or minus twenty-five percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

All documents referred to herein are "incorporated by reference" in their entirety.

The term "at least" is synonymous with "greater than or equal to".

As used herein, "at least one of" is synonymous with "one or more of". For example, the phrase "at least one of A, B, or C" means any one of A, B, or C, or any combination of any two or more of A, B, or C. For example, "at least one of A, B, and C" includes A alone; or B alone; or C alone; or A and B; or A and C; or B and C; or all of A, B, and C.

The word "comprising" and "comprises", and the like, does not exclude the presence of elements or steps other than those listed in any claim or the specification as a whole. In the present specification, "comprises" means "includes" and "comprising" means "including".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular", "transverse", "substantially perpendicular", or "substantially transverse" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The discussion of various embodiments or aspects may describe certain features as being "particularly" or "preferably" within certain limitations (e.g., "preferably", "more preferably", or "even more preferably", within certain limitations). It is to be understood that the disclosure is not limited to these particular or preferred limitations but encompasses the entire scope of the various embodiments and aspects described herein.

The disclosure comprises, consists of, or consists essentially of, the following embodiments or aspects, in any combination. Various embodiments or aspects of the disclosure are illustrated in separate drawing figures. However, it is to be understood that this is simply for ease of illustration and discussion. In the practice of the disclosure, one or more embodiments or aspects shown in one drawing figure can be combined with one or more embodiments or aspects shown in one or more of the other drawing figures.

Referring to the drawings, and initially to FIG. 1, there is shown a safety line arrangement in which a prior art turnbuckle device 1 is used to tension a safety line 2 between two anchor points 3, 4. In the safety line system shown in FIG. 1, a plastically deformable energy absorber 5 is positioned intermediately between the turnbuckle device 1 and the adjacent anchor point 3. This is however merely exemplary. The energy absorber 5 is secured to a first one of the screw threaded turnbuckle connectors. The other of the screw threaded turnbuckle connectors is secured to the lifeline 2. The lifeline 2 is typically much longer than shown in respect of the drawing with respect to the turnbuckle device 1 and the energy absorber 5. In use, for example, a user clips a personal lifeline attached to a harness to the safety line 2 and can then pass along the safety line 2 in secure fashion.

Figure 2:
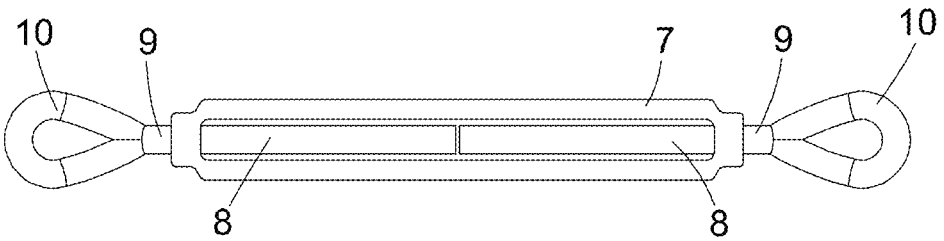
FIG. 2 is a close-up schematic view of the prior art turnbuckle device of FIG. 1.

As described above, as the turnbuckle body or chassis is rotated about its axis in a first direction, the threaded turnbuckle connectors are drawn into the turnbuckle body or chassis, thereby tensioning the safety line 2. Rotation of the turnbuckle in the opposite direction results in the threaded elements moving apart from one another and slackening the safety line 2. The turnbuckle device 1 as known in the prior art is shown in FIG. 2. The turnbuckle device 1 includes a body or chassis 7 having at opposed ends, separate respective threaded bores for receiving the correspondingly screw threaded shaft 8 of a respective turnbuckle threaded connector 9. The terminus of the threaded turnbuckle connectors 9 is eyes 10. In FIG. 2, the turnbuckle device 1 is shown at its maximum tightened extent. The eyes 10 are close to the opposed ends of the turnbuckle chassis or body 7 and the ends of the threaded shafts are close to one another or abutting.

Figure 3:
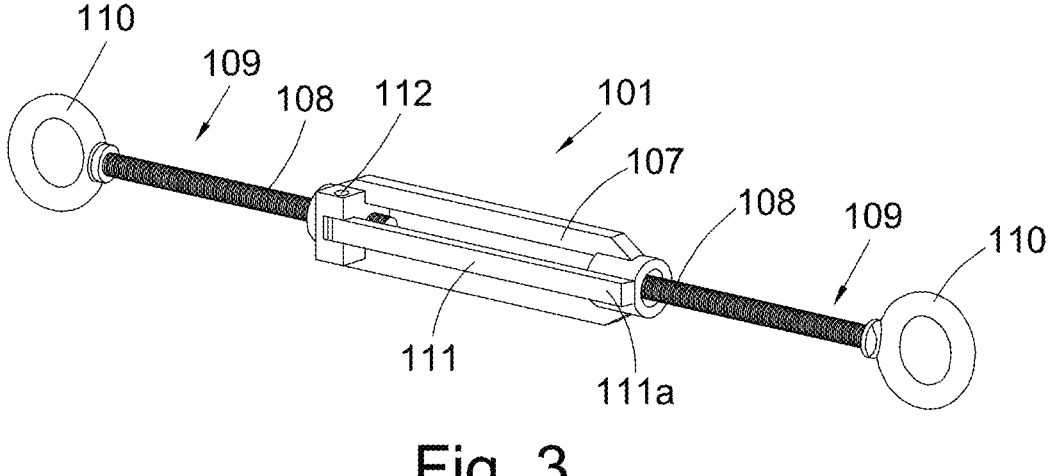
FIG. 3 is a schematic perspective view of a turnbuckle device in accordance with some non-limiting embodiments or aspects of the present disclosure, with the turnbuckle device shown in a first configuration.
Figure 4:
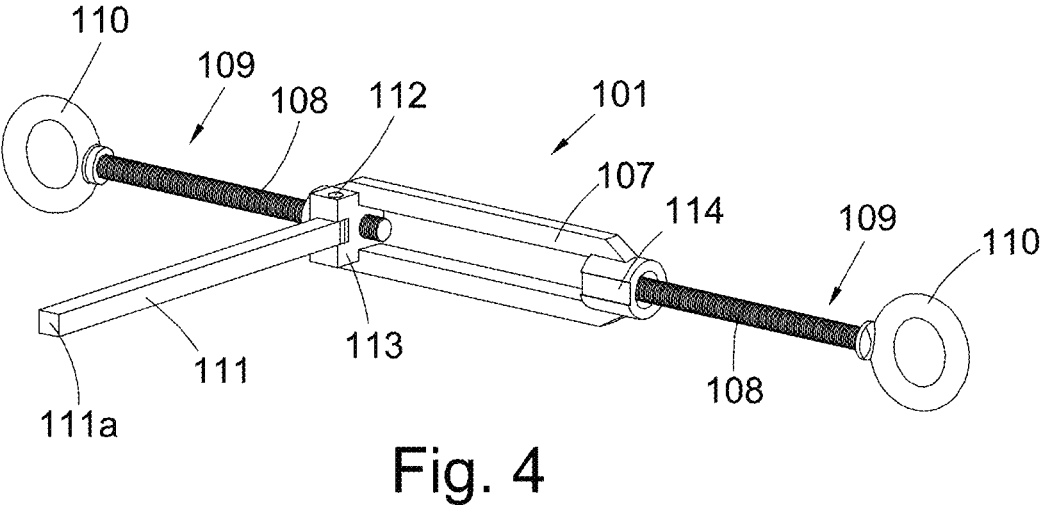
FIG. 4 is a schematic perspective view of the turnbuckle device of FIG. 3 in accordance with some non-limiting embodiments or aspects of the present disclosure.

Turning now to FIGS. 3-4, a turnbuckle device 101 is shown in accordance with some non-limiting embodiments or aspects of the present disclosure. The turnbuckle device 101 includes a body or chassis 107 having at opposed ends, separate respective threaded bores for receiving the corresponding screw threaded shaft 108 of a respective turnbuckle threaded connector 109. The terminus of the threaded turnbuckle connectors 109 is eyes 110. In FIGS. 3-4, the turnbuckle device 101 is shown at its maximum non-tightened extent. The eyes 110 are extended at their maximum extent away from the opposed ends of the turnbuckle chassis or body 107 and the ends of the threaded shafts 108 are spaced at their maximum extents apart.

In some non-limiting embodiments or aspects, the turnbuckle device 101 has, mounted to the body or chassis 107, a handle 111. The handle 111 is pivotally mounted by means of a pivot connection 112 in a support boss 113 at the end of the turnbuckle body or chassis 107. The handle 111 can be pivoted about the pivot connection 112 through 90 degrees from a stowed position shown in FIG. 3, to an operational position shown in FIG. 4. In the stowed position, the longitudinal axis of the handle 111 is parallel to the longitudinal axis of the turnbuckle body or chassis 107. In the stowed position, the free end 111*a* of the turnbuckle handle 111 is nested in a receiving recess 113 provided at the opposed end of the body or chassis 107 to the pivot mounting 112. In the stowed position, the handle 111 may be secured by a securing device so that the handle 111 does not project or swing outwardly to the operational position. For example, the free end 111*a* can be received in the recess 114 in a semi interference or resiliently gripping fit. In some non-limiting embodiments or aspects, other securing means could be utilised.

When pivoted to the operational position, the handle 111 projects outwardly at 90 degrees and acts as a lever fixed to the turnbuckle body or chassis 107 to enable the turnbuckle body or chassis 107 to be rotated about its longitudinal axis, in order to either increase or relax the tension in the safety line 2 by drawing the connectors 109 together or forcing them apart.

Typically, in the prior art, it is required to tension the turnbuckle to a degree greater than is possible by hand tightening alone. Typically, therefore installers are required to carry and use specific turnbuckle tensioner tools that are carried separately and used to tighten the turnbuckle before being removed from the site. If these tools are mislaid or forgotten then there is a risk that the turnbuckle device 101 will not be tightened adequately thereby prejudicing the integrity of the whole safety system.

The turnbuckle device 101 described herein avoids this because the tightening tool (lever handle 111) is mounted integrally to the turnbuckle device 101 and cannot be mislaid. The handle 111 is easily and safely deployed from stowed to operational positions and can be returned to the stowed position subsequently to being used.

Figure 5A:
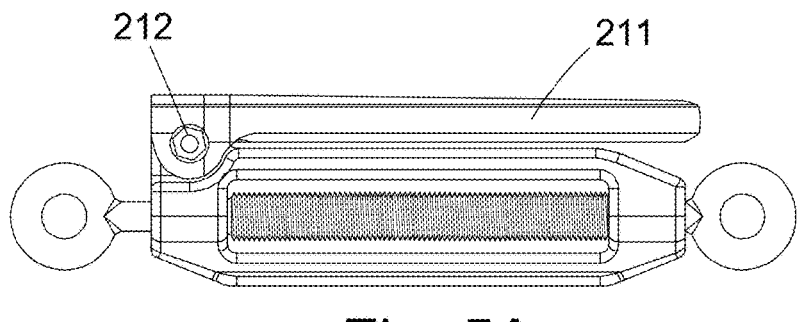
FIGS. 5A-5D are views of a turnbuckle device according to some non-limiting embodiments or aspects of the present disclosure.
Figure 5B:
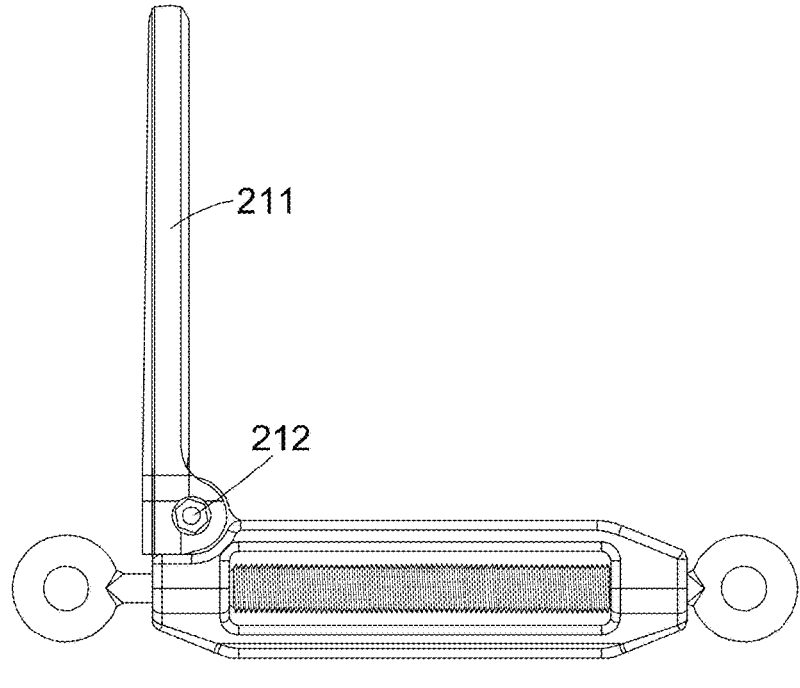
Figures 5C, 5D:
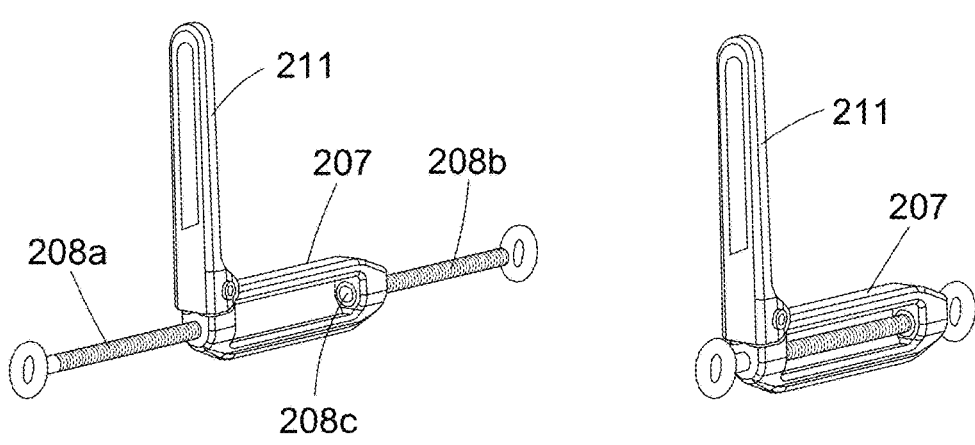
Figure 6:
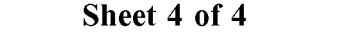
FIG. 6 is a schematic sectional view of the turnbuckle device shown in FIGS. 5A-5D.

With reference to FIGS. 5-6, a turnbuckle device is shown in accordance with some non-limiting embodiments or aspects of the present disclosure. The turnbuckle device is similar to the turnbuckle device 101 shown in FIGS. 3-4 in that a handle 211 is integrally and pivotally mounted to the turnbuckle chassis or body 207 by a pivot mounting 212. All the inventive benefits of an integrally mounted handle/lever are therefore provided for the turnbuckle device shown in FIGS. 5-6. Further advantageously, in the turnbuckle device shown in FIGS. 5-6, one of the threaded shafts 208*a* is of a reduced diameter and able to be received (substantially entirely) in an elongate axial bore 208*c* provided in the other of the threaded shafts 208*b* (see FIG. 5C). This means that when the turnbuckle is tensioned to the maximum extent (FIGS. 5A, 5B, 5D) one shaft is received substantially entirely within the other. The threaded shafts are in threaded engagement within the threaded bores at the ends of the turnbuckle body or chassis 207, only, and the shafts are not in threaded engagement with one another. One is simply received within the other without threaded driving engagement. The effect of this is that the overall length of the turnbuckle body or chassis 207 from end to end is half that when compared to the previously described embodiment for the same overall tensioning effect. This means that the safety line 2 can extend to a greater distance and come to a termination closer to the anchor point 3, 4, and also reduce overall weight for the turnbuckle device.

There is synergy in providing the turnbuckle with an integrated operating handle 211 and tensioning elements that are configured for one of the threaded elements 208*a* to be received in the other 208*b*. This is because the overall length of the turnbuckle body or chassis 207 can be made shorter but allow a handle 211 of sufficient length to be accommodated extending between the opposed ends of the turnbuckle body or chassis. This allows for overall weight optimisation for the turnbuckle device.

The non-limiting embodiments or aspects of the present disclosure have been described in detail herein. However, it will be appreciated by those skilled in the art that various modifications and alternatives to the embodiments or aspects may be made without departing from the concepts disclosed in the foregoing description. Such modifications are to be considered as included within the following claims unless the claims, by their language, expressly state otherwise. Accordingly, the particular embodiments or aspects described in detail hereinabove are illustrative only and are not limiting as to the scope of the disclosure, which is to be given the full breadth of the appended claims and any and all equivalents thereof.

The invention claimed is:

1. A turnbuckle system, comprising:
   a safety line;
   a body having a pair of opposing ends, with each end having a threaded bore;
   a pair of connectors, with each connector having a threaded shaft configured for being received in the threaded bore of one of the pair of opposing ends of the body, each connector being configured to be coupled to a portion of the safety line;

a handle connected to the body, wherein the handle is movable between a stowed position and an operational position, wherein, in the operational position, the handle is configured for facilitating rotation of the body about a longitudinal axis of the body and the handle projects outwardly at 90 degrees and acts as a lever fixed to the body to enable the body to be rotated about its longitudinal axis in order to either increase or relax tension in the safety line by drawing the connectors together or forcing them apart; and a securing arrangement for securing the handle in the stowed position so that the handle does not project or swing outwardly to the operational position, wherein the handle is integrally and pivotally mounted at one end of the body by a pivot connection, wherein the body encompasses an integral pivot mounting support for the handle with one end of the handle being connected to the pivot mounting support via the pivot connection, and the handle is movable through 90 degrees between the stowed position and the operational position, wherein the handle is limited to rotate beyond the operational position, meaning further away from the stowed position, by means of contact between the pivot mounting support of the body and the handle in the operational position, and wherein a diameter of a first of the pair of connectors is smaller than a diameter of a second of the pair of connectors, wherein the threaded shaft of the second of the pair of connectors has an elongate axial bore configured for receiving the threaded shaft of the first of the pair of connectors within the elongate axial bore.

2. The turnbuckle system according to claim 1, wherein, in the stowed position, a longitudinal axis of the handle is substantially parallel to the longitudinal axis of the body.

3. The turnbuckle system according to claim 1, wherein, in the operational position, a longitudinal axis of the handle is substantially transverse to the longitudinal axis of the body.

4. The turnbuckle system according to claim 1, wherein the handle is secured in a receiving recess in a semi interference or resiliently gripping fit.

5. The turnbuckle system of claim 4, wherein a portion of the handle spaced from a proximal portion of the handle is nested in the receiving recess opposite the proximal portion.

6. The turnbuckle system according to claim 1, wherein a terminus of each of the pair of connectors is an eye.

* * * * *